(12) United States Patent
Hotokeishi (10) Patent No.: US 10,157,336 B2
(45) Date of Patent: Dec. 18, 2018

(54) APPARATUS AND METHOD FOR DISPLAYING ERROR INFORMATION IN A PRINTING PROCESS (71) Applicant: FUJI XEROX CO., LTD., Tokyo (JP)

(72) Inventor: Kenichirou Hotokeishi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/488,839

(22) Filed: Apr. 17, 2017

(65) Prior Publication Data
US 2018/0101756 A1 Apr. 12, 2018

(30) Foreign Application Priority Data
Oct. 11, 2016 (JP) .................... 2016-200048

(51) Int. Cl.
G06F 15/00 (2006.01)
G06F 1/00 (2006.01)
(Continued)

(52) U.S. Cl.
CPC ....... *G06K 15/408* (2013.01); *G06K 15/1802* (2013.01); *G06K 15/1805* (2013.01);
(Continued)

(58) Field of Classification Search
CPC ............. G06K 15/408; G06K 15/1802; G06K 15/1805; G06K 15/1809; G06K 15/1822;
(Continued)

(56) References Cited

U.S. PATENT DOCUMENTS 6,266,150 B1    7/2001   Brossman et al.
7,180,623 B2 *   2/2007   Kato ..................... G06F 3/1204
                                                             358/1.15
(Continued)

FOREIGN PATENT DOCUMENTS

JP     2010-026408 A    2/2010
JP     2010-094920 A    4/2010
(Continued)

OTHER PUBLICATIONS

May 2, 2018 Office Action issued in Australian Patent Application No. 2017203478.

*Primary Examiner* — Douglas Tran
(74) *Attorney, Agent, or Firm* — Oliff PLC (57) ABSTRACT An information processing apparatus includes a first acquiring unit that acquires a processing attribute of a printing process corresponding to a printing instruction for executing the printing process using print data, a second acquiring unit that acquires an apparatus attribute of an image forming apparatus that executes the printing process, a third acquiring unit that acquires a data attribute of the print data, a print data interpretation unit that performs an interpreting process for the print data based on the processing attribute, a request unit that requests the print data interpretation unit to perform the interpreting process according to the printing instruction when it is not possible to determine from at least one of the processing attribute, the apparatus attribute and the data attribute whether or not an error occurs in the printing process, and a controller that displays information indicating that the error occurs in the printing process.

14 Claims, 9 Drawing Sheets (51) Int. Cl.
*G06K 15/00* (2006.01)
*G06K 15/02* (2006.01)

(52) U.S. Cl.
CPC ..... *G06K 15/1809* (2013.01); *G06K 15/1822* (2013.01); *G06K 15/1823* (2013.01); *G06K 15/1849* (2013.01); *G06K 2215/0017* (2013.01); *G06K 2215/0085* (2013.01)

(58) Field of Classification Search
CPC ....... G06K 15/1849; G06K 2215/0017; G06K 2215/0085
USPC ..................... 358/1.1, 1.14, 1.15, 1.13, 1.9
See application file for complete search history.

(56) References Cited

U.S. PATENT DOCUMENTS

| | | |
|---|---|---|
| 2004/0080767 A1 | 4/2004 | Meilstrup et al. |
| 2009/0279108 A1 | 11/2009 | Hoshi et al. |
| 2010/0020357 A1 | 1/2010 | Amino |
| 2012/0019866 A1 | 1/2012 | Kuroshima |
| 2012/0212781 A1 | 8/2012 | Kohata |
| 2016/0179450 A1* | 6/2016 | Shirai .................. G06F 3/1247 358/1.15 |

FOREIGN PATENT DOCUMENTS

| | | |
|---|---|---|
| JP | 4670897 B2 | 4/2011 |
| JP | 4905114 B2 | 3/2012 |

* cited by examiner

| ID | PROCESS-ING NAME | SIZE | RECEPTION START DATE/TIME | HOLD DATE/TIME |
|---|---|---|---|---|
| 1 | 1.ps | 1KB | 2016/03/23 15:28:21 | 2016/03/23 15:28:23 |
| 2 | A3-blank-L.tif | 155KB | 2016/03/23 15:28:23 | 2016/03/23 15:28:24 |
| 3 | A3-blank-P.tif | 131KB | 2016/03/23 15:28:24 | 2016/03/23 15:28:25 |
| 4 | A4-10p-1.pdf | 77KB | 2016/03/23 15:28:26 | 2016/03/23 15:28:26 |
| 5 | A4-10p-10.pdf | 77KB | 2016/03/23 15:28:27 | 2016/03/23 15:28:28 |
| 6 | A4-10p-2.pdf | 77KB | 2016/03/23 15:28:28 | 2016/03/23 15:28:29 |
| 7 | A4-10p-3.pdf | 77KB | 2016/03/23 15:28:29 | 2016/03/23 15:28:31 |
| 8 | A4-10p-4.pdf | 77KB | 2016/03/23 15:28:31 | 2016/03/23 15:28:32 |
| 9 | A4-10p-5.pdf | 77KB | 2016/03/23 15:28:32 | 2016/03/23 15:28:33 |
| 10 | A4-10p-6.pdf | 77KB | 2016/03/23 15:28:33 | 2016/03/23 15:28:33 |
| 11 | A4-10p-7.pdf | 77KB | 2016/03/23 15:28:34 | 2016/03/23 15:28:34 |
| 12 | A4-10p-8.pdf | 77KB | 2016/03/23 15:28:35 | 2016/03/23 15:28:35 |
| 13 | A4-10p-9.pdf | 77KB | 2016/03/23 15:28:36 | 2016/03/23 15:28:36 |

HOLD: 13

JOB PREDICTION

| ID | SUB ID | PRINT DATA NAME | TAG | PREDICTION RESULT | A3 | A4 | A5 | PAPER ACCOMMODATING UNIT |
|---|---|---|---|---|---|---|---|---|
| 1 | | 1.ps | | NORMAL | 0 | 1 | 0 | TRAY 2:A4LEF, PLAIN PAPER, WHITE, 90 |
| 2 | | A3-blank-L.tif | | NORMAL | 1 | 0 | 0 | TRAY 3:A3SEF, PLAIN PAPER, WHITE, 90 |
| 3 | | A3-blank-P.tif | | NORMAL | 1 | 0 | 0 | TRAY 3:A3SEF, PLAIN PAPER, WHITE, 90 |
| 4 | | A4-10p-1.pdf | | NORMAL | 0 | 10 | 0 | TRAY 2:A4LEF, PLAIN PAPER, WHITE, 90 |
| 5 | | A4-10p-10.pdf | | IMPOSITION COMBINATION ERROR (NO PHYSICAL PAGE) | 0 | 0 | 0 | |
| 6 | | A4-10p-2.pdf | | NORMAL | 0 | 10 | 0 | TRAY 2:A4LEF, PLAIN PAPER, WHITE, 90 |
| 7 | | A4-10p-3.pdf | | NORMAL | 0 | 10 | 0 | TRAY 2:A4LEF, PLAIN PAPER, WHITE, 90 |
| 8 | | A4-10p-4.pdf | | NORMAL | 0 | 10 | 0 | TRAY 2:A4LEF, PLAIN PAPER, WHITE, 90 |
| 9 | | A4-10p-5.pdf | | NORMAL | 0 | 10 | 0 | TRAY 2:A4LEF, PLAIN PAPER, WHITE, 90 |
| 10 | | A4-10p-6.pdf | | NORMAL | 0 | 10 | 0 | TRAY 2:A4LEF, PLAIN PAPER, WHITE, 90 |
| 11 | | A4-10p-7.pdf | | NORMAL | 0 | 10 | 0 | TRAY 2:A4LEF, PLAIN PAPER, WHITE, 90 |
| 12 | | A4-10p-8.pdf | | NORMAL | 0 | 10 | 0 | TRAY 2:A4LEF, PLAIN PAPER, WHITE, 90 |
| 13 | | A4-10p-9.pdf | | NORMAL | 0 | 0 | 10 | NO CORRESPONDING PAPER ACCOMMODATING UNIT |
| TOTAL | | | | | 2 | 81 | 10 | |

JOB PREDICTION
USER NAME:Administrator
PREDICTION OF THE NUMBER OF SHEETS TO BE USED

US 10,157,336 B2

APPARATUS AND METHOD FOR DISPLAYING ERROR INFORMATION IN A PRINTING PROCESS

CROSS-REFERENCE TO RELATED APPLICATIONS

This application is based on and claims priority under 35 USC 119 from Japanese Patent Application No. 2016-200048 filed Oct. 11, 2016.

BACKGROUND

Technical Field

The present invention relates to an information processing apparatus, an information processing method, and a non-transitory computer readable storage medium.

SUMMARY

According to an aspect of the invention, an information processing apparatus includes a first acquiring unit that acquires a processing attribute of a printing process corresponding to a printing instruction for executing the printing process using print data, a second acquiring unit that acquires an apparatus attribute of an image forming apparatus that executes the printing process, a third acquiring unit that acquires a data attribute of the print data, a print data interpretation unit that performs an interpreting process for the print data based on the processing attribute, a request unit that requests the print data interpretation unit to perform the interpreting process according to the printing instruction when it is not possible to determine from at least one of the processing attribute, the apparatus attribute and the data attribute whether or not an error occurs in the printing process, and a controller that displays information indicating that the error occurs in the printing process and information indicating a cause of the error on a display when information indicating the occurrence of the error is included in a processing result of the interpreting process.

BRIEF DESCRIPTION OF THE DRAWINGS

Exemplary embodiments of the present invention will be described in detail based on the following figures, wherein.

DETAILED DESCRIPTION

[1] Configuration

Figure 1:
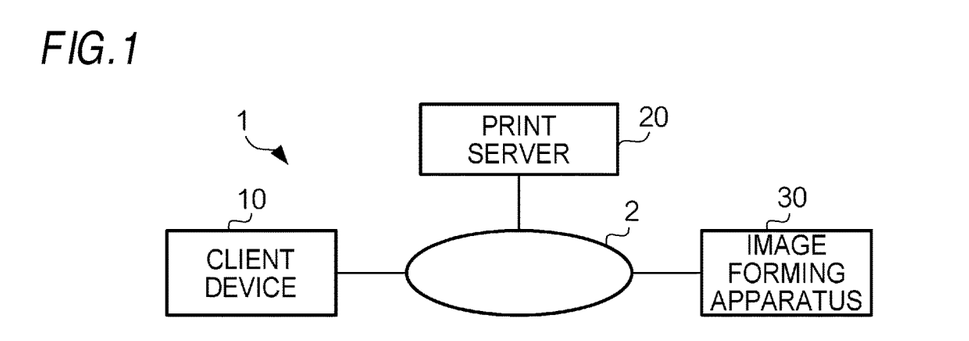
FIG. 1 is a view illustrating the configuration of a system.

FIG. 1 is a block diagram illustrating the configuration of a system 1 according to an exemplary embodiment. The system 1 includes a client device 10, a print server 20 (an example of an information processing apparatus) and an image forming apparatus 30. The client device 10 is a device operated by a user, such as a personal computer. The print server 20 relays and controls an instruction of image forming processing from the client device 10 to the image forming apparatus 30. The image forming apparatus 30 forms an image on a recording medium, such as paper, using an electrophotographic method or the like. The client device 10 is connected to the print server 20 and the image forming apparatus 30 via a communication line 2. The communication line 2 includes at least one of, e.g., the Internet, a mobile communication network, a telephone line and a LAN (Local Area Network).

Figure 2:
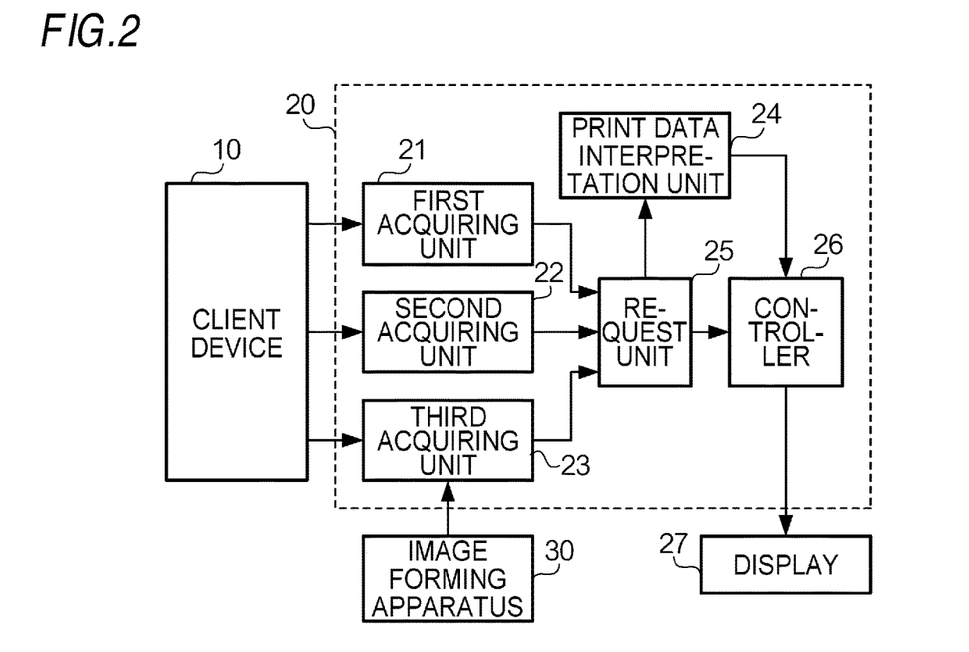
FIG. 2 is a view illustrating the functional configuration of a print server.

FIG. 2 is a block diagram illustrating an example of the functional configuration of the print server 20. The print server 20 includes a first acquiring unit 21, a second acquiring unit 22, a third acquiring unit 23, a print data interpretation unit 24, a request unit 25 and a controller 26. The first acquiring unit 21 acquires the processing attribute of a printing process corresponding to a print instruction for using print data to execute the printing process. The second acquiring unit 22 acquires the apparatus attribute of the image forming apparatus 30 that executes the printing process. The third acquiring unit 23 acquires the data attribute of the print data. The print data interpretation unit 24 performs an interpreting process for the print data based on the processing attribute. The request unit 25 requests the print data interpretation unit to perform the interpreting process according to the print instruction when it is not possible to determine whether or not an error occurs in the printing process from at least one of the processing attribute, the apparatus attribute and the data attribute. When a processing result of the interpreting process contains information indicating the occurrence of the error, the controller 26 performs a control to display, on a display 27, information indicating that an error occurs in the printing process and information indicating the cause of the error.

Figure 3:
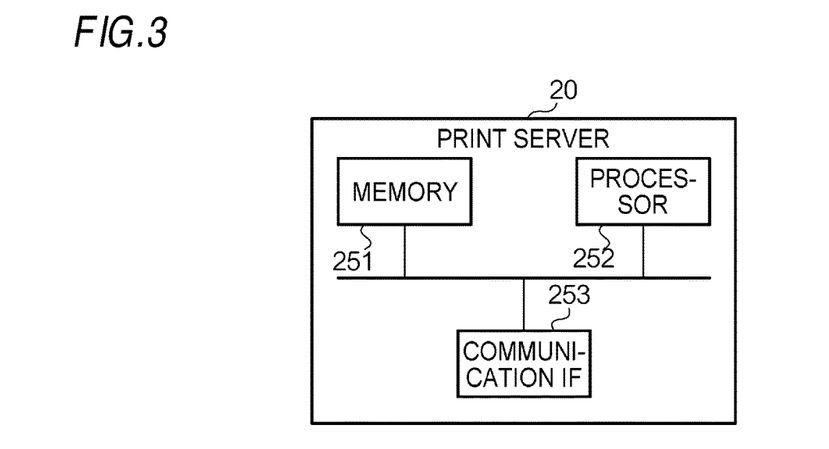
FIG. 3 is a view illustrating the hardware configuration of the print server.

FIG. 3 is a view illustrating the hardware configuration of the print server 20. In the figure, a memory 251 stores various data. A processor 252 performs data processing according to a program stored in the memory 251. A communication IF 253 is an interface for performing data communication with an external device via a network.

In this example, when the processor 252 executes the program stored in the memory 251, the function illustrated in FIG. 2 is implemented. The processor 252 executing the program is an example of the first acquiring unit 21, the second acquiring unit 22, the third acquiring unit 23, the print data interpretation unit 24, the request unit 25 and the controller 26.

[2] Operation

Using an operation device connected to the client device 10, the user designates print data to be processed in the printing process and performs an operation for instructing the printing process. A processor of the client device 10 transmits a print instruction corresponding to the designated print data to the print server 20 in response to the operation by the user. The print instruction may include a set value of a setting item related to printing. For example, the setting item may be "duplex/single-sided" or the size (A4, B3, etc.) of paper (recording medium).

The print instruction data indicating the print instruction transmitted from the client device 10 to the print server 20 is accumulated in the print server 20 and is sequentially processed by the print server 20. The user may use the client device 10 to confirm the print instruction data accumulated in the print server 20. When the user uses the operation device connected to the client device 10 to perform an operation for displaying a list of the print instruction data accumulated in the print server 20, the processor 152 of the client device 10 transmits a list acquisition request to the print server 20. In response to the acquisition request transmitted from the client device 10, the processor 252 of the print server 20 transmits data representing the contents of the list of print instruction data to the client device 10. The processor 152 of the client device 10 displays, on the display device, a screen representing the print instruction data list according to the data transmitted from the print server 20.

Figure 4:
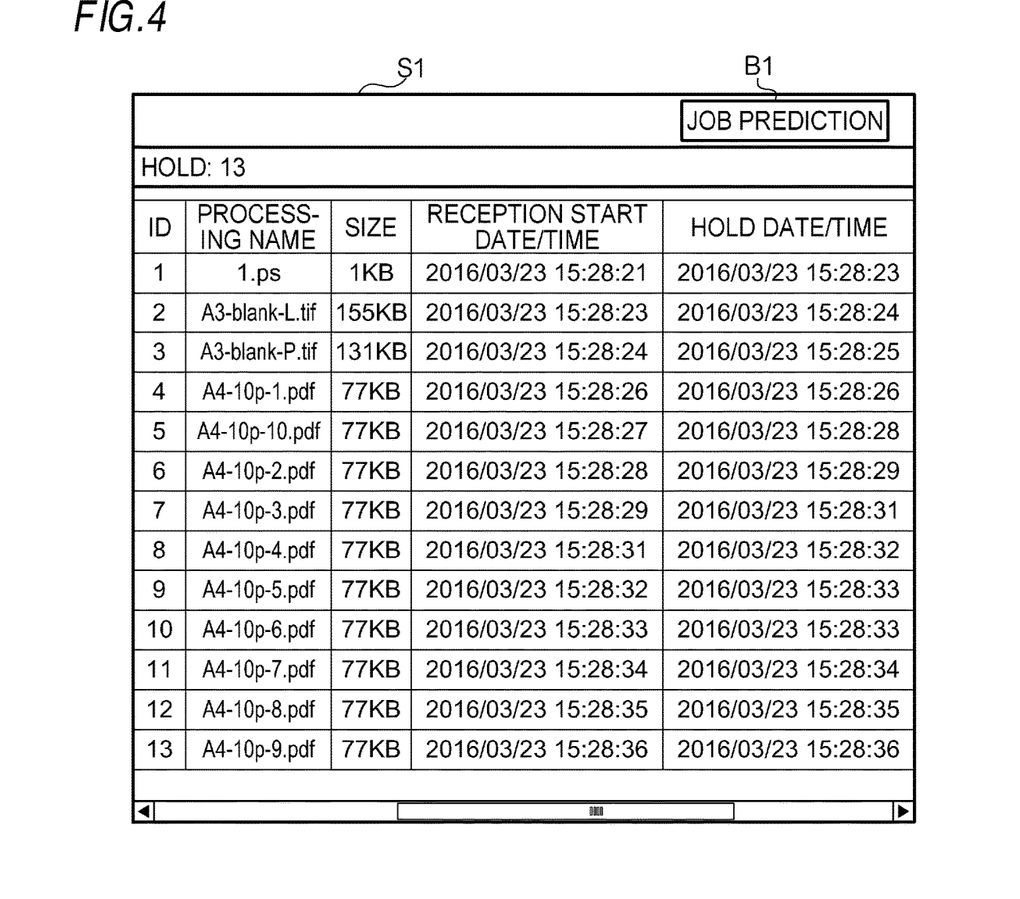
FIG. 4 is a view illustrating an example of a screen displayed on a display device of a client device.

FIG. 4 is a view illustrating an example of a screen S1 displayed on the display device of the client device 10. In this screen, a list of print instruction data accumulated in the print server is displayed. In this example, the print instruction data includes items of "ID", "processing name", "size", "reception start date/time" and "hold date/time". Of these items, the item "ID" stores identification information for identifying the print instruction data. The item "processing name" stores identification information (for example, file name) for identifying the print data. The item "size" stores information indicating the size of the print data. The item "reception start date/time" stores information indicating the date/time at which reception of the print instruction data is started. The item "hold date/time" stores information indicating the date/time at which the printing instruction is held.

On the screen S1 is displayed a button B1 for performing a process for estimating (predicting) whether or not an error occurs in the printing process before the printing process is executed (hereinafter referred to as a "checking process"). When a user desires to perform the check processing, the user selects the print instruction data to be checked on the screen illustrated in FIG. 4 and presses the button B1 to instruct the execution of the checking process. When the user presses the button B1, the processor 152 of the client device 10 displays, on the display device, a screen for confirming whether or not the checking process.

Figure 5:
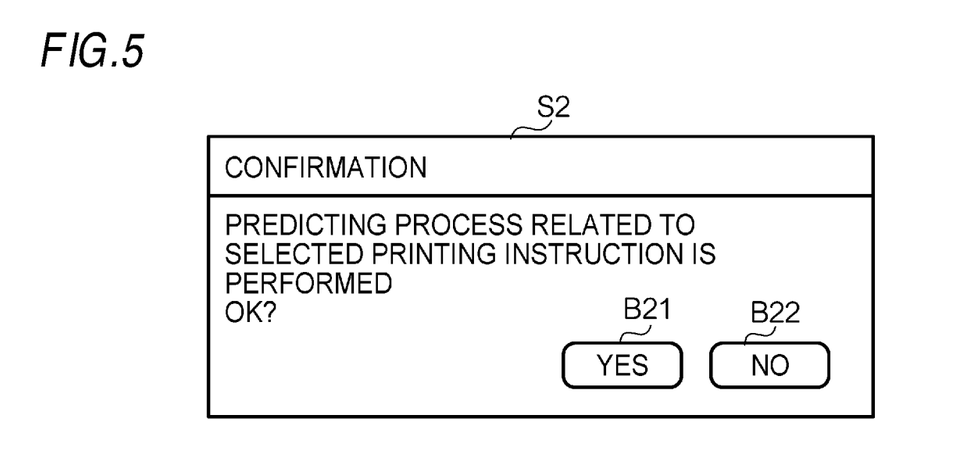
FIG. 5 is a view illustrating an example of a confirmation screen.

FIG. 5 is a view illustrating an example of a confirmation screen S2 displayed on the display device. The confirmation screen S2 includes a button B21 for instructing the execution of the checking process and a button B22 for canceling the checking process. When the user presses the button B21, the processor 152 of the client device 10 transmits an instruction to execute the checking process to the print server 20.

Figure 6:
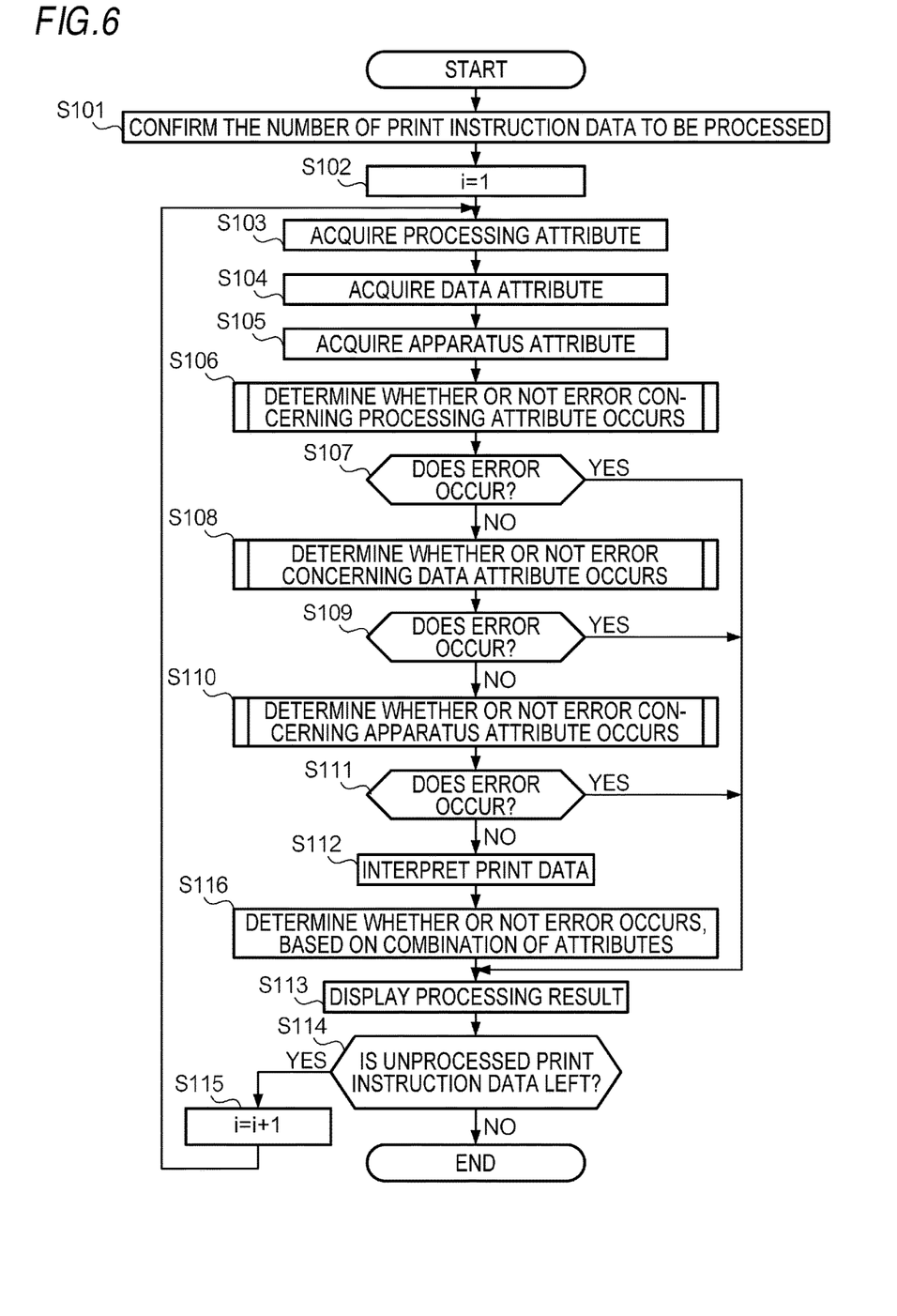
FIG. 6 is a flowchart illustrating a flow of a process performed by the print server.

FIG. 6 is a flowchart illustrating a flow of a process performed by the processor 252 of the print server 20. The process illustrated in FIG. 6 is started when the print server 20 receives an instruction to execute the checking process from the client device 10. In step S101, the processor 252 confirms the number of print instruction data (that is, printing process data selected by the user) that is the object of the checking process, according to the received instruction. In step S102, the processor 252 sets a counter i to 1.

In step S103, the processor 252 acquires the processing attribute of the printing process corresponding to the $i^{th}$ print instruction data. In this example, setting values of various setting items related to the printing process are used as the processing attributes. The processing attribute includes, for example, a setting value of "color/monochrome", the number of copies, a setting value of "duplex/single-sided", the number of N-ups, and a page range by which output is specified (a start page number and an end page number by which output is specified).

In step S104, the processor 252 acquires the data attribute of the print data corresponding to the $i^{th}$ print instruction data. In this example, the data attribute is information indicating the attribute of the print data and includes, for example, the size of the print data, the total number of pages, a range of page numbers (the start page number and the end page number), the first page number to which a page number is allocated (hereinafter referred to as a "start page number"), and the like.

In step S105, the processor 252 acquires the apparatus attribute of the image forming apparatus 30 that executes the printing process corresponding to the $i^{th}$ print instruction data. The print instruction data includes information indicating the image forming apparatus 30 that executes the printing process. The processor 252 specifies the image forming apparatus that executes the printing process, based on this information. When the image forming apparatus is specified, the processor 252 acquires the apparatus attribute indicating the attribute of the apparatus from the specified image forming apparatus. In this example, the apparatus attribute includes, for example, accommodating unit information on a paper accommodating unit of the image forming apparatus, paper information indicating the size and type of paper accommodated in the paper accommodating unit, information indicating whether or not printing corresponds to color printing (or monochrome printing), information indicating whether or not printing corresponds to duplex printing (or single-sided printing), and the like.

In step S106, the processor 252 determines whether or not there is a problem in the contents of the processing attribute, that is, whether or not an error concerning the processing attribute has occurred.

Figure 7:
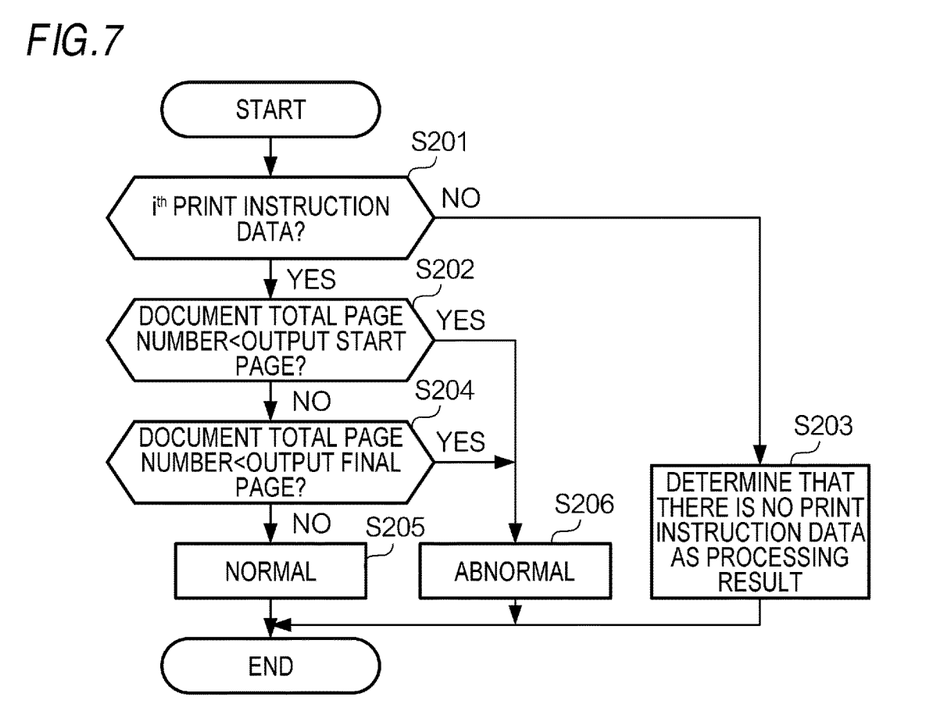
FIG. 7 is a flowchart illustrating a flow of a process of determining the presence/absence of an occurrence of an error related to a processing attribute.

FIG. 7 is a flowchart illustrating an example of a flow of a process (step S106 of FIG. 6) for determining whether or not an error concerning the processing attribute has occurred. The example of FIG. 7 illustrates an operation of determining whether or not an error concerning a page range whose output is designated (hereinafter referred to as an "output page range") has occurred. In step S201, the processor 252 determines whether or not the $i^{th}$ print instruction data exists. When it is determined in the step S201 that the $i^{th}$ print instruction data exists, the processor 252 proceeds to step S202. Meanwhile, when it is determined that there is no $i^{th}$ print instruction data, the processor 252 proceeds to step S203. In step S203, the processor 252 determines that there is no print instruction data as a processing result.

In step S202, the processor 252 determines whether or not the total number of pages of the print data (hereinafter referred to as a "document total page number") is smaller than the first page number of the output page range (hereinafter referred to as an "output start page number"). When it is determined that the document total page number is smaller than the output start page number, the processor 252 proceeds to step S204. Meanwhile, when it is determined that the document total page number is equal to or greater than the output start page number, the processor 252 proceeds to step S206.

In step S204, the processor 252 determines whether or not the document total page number is smaller than the last page number of the page range by which output is designated (hereinafter referred to as an "output final page number"). When it is determined that the document total page number is smaller than the output final page number, the processor 252 proceeds to step S205. Meanwhile, when it is determined that the document total page number is equal to or greater than the output final page number, the processor 252 proceeds to step S206.

In step S205, the processor 252 determines that the setting value of the output page range is normal. Meanwhile, in step S206, the processor 252 determines that the setting value of the output page range is abnormal, that is, that an error occurs.

In this operation example, the operation exemplified in FIG. 7 has been described as an operation example of determining whether or not an error concerning the processing attribute has occurred. The method of determining whether or not an error concerning the processing attribute has occurred is not limited to that illustrated in FIG. 7. For example, the processor 252 may confirm an imposition template data name designated as the processing attribute, and may determine that an error occurs when detecting that the corresponding imposition template data is not present in the server.

Returning to FIG. 6, in step S107, the processor 252 determines whether or not an error occurs, based on a result of the determination of step S106. When it is determined that an error occurs, the processor 252 skips steps S108 to S112 and proceeds to step S113. Meanwhile, when it is determined that no error occurs, the processor 252 proceeds to the step S108.

In step S108, the processor 252 determines whether or not an error concerning the data attribute of the print data has occurred.

Figure 8:
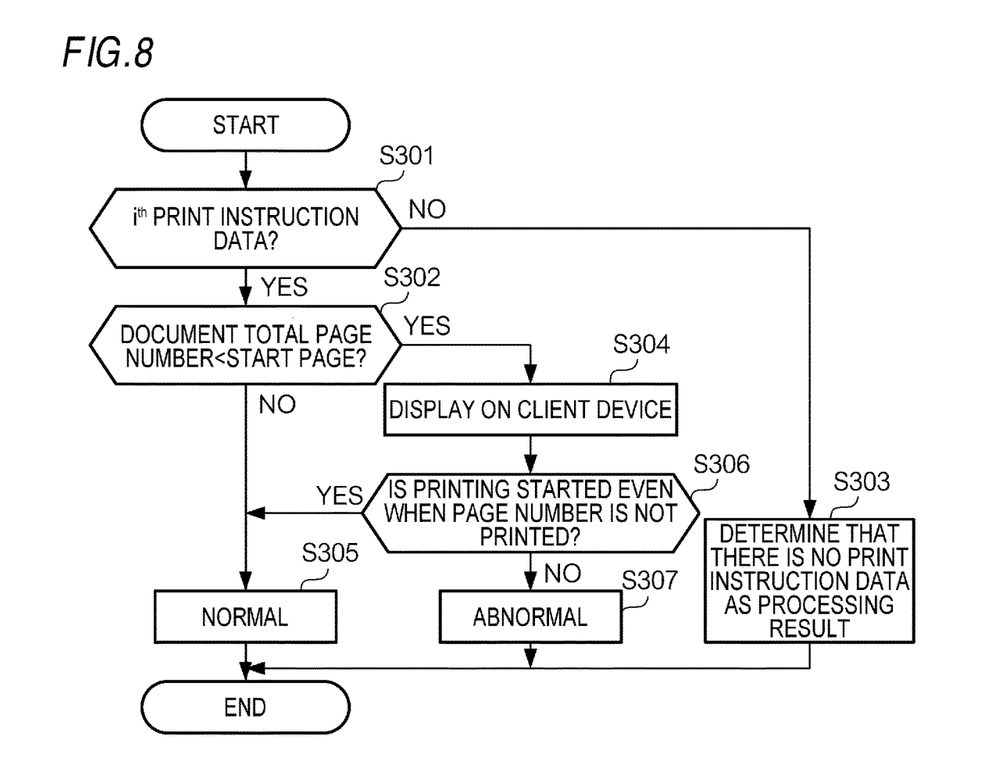
FIG. 8 is a flowchart illustrating a flow of a process of determining the presence/absence of an occurrence of an error related to a data attribute.

FIG. 8 is a flowchart illustrating an example of a flow of a process (step S108 in FIG. 6) for determining whether or not an error concerning the data attribute has occurred. The example of FIG. 8 illustrates an operation of determining whether or not an error concerning the start page number has occurred. In step S301, the processor 252 determines whether or not the $i^{th}$ print instruction data exists. When it is determined in step S301 that the $i^{th}$ print instruction data exists, the processor 252 proceeds to step S302. Meanwhile, when it is determined that there is no $i^{th}$ print instruction data, the processor 252 proceeds to step S303. In step S303, the processor 252 determines that there is no print instruction data as a processing result.

In step S302, the processor 252 determines whether or not the document total page number is smaller than the start page number. When it is determined that the document total page number is smaller than the start page number, the processor 252 proceeds to step S304. Meanwhile, when it is determined that the document total page number is equal to or greater than the start page number, the processor 252 proceeds to step S305.

In step S304, the processor 252 performs a process for causing the client device 10 to display that a page number is not printed with the current setting. Specifically, the processor 252 transmits data indicating that the page number is not printed with the current setting, to the client device 10, and the processor of the client device 10 displays the information on the display device according to the received data. In step S306, the processor 252 determines whether or not printing is performed even when the page number is not printed, in accordance with a response from the client device 10. When it is determined that printing is performed even if the page number is not printed (YES in the step S306), the processor 252 proceeds to step S305. Meanwhile, when it is determined that printing is not started (NO in step S306), the processor 252 proceeds to step S307.

In step S305, the processor 252 determines that no error concerning the start page number occurs (normal). Meanwhile, in step S307, the processor 252 determines that the setting value of the start page number is abnormal, that is, that an error occurs.

In this operation example, the operation exemplified in FIG. 8 has been described as an operation example for determining whether or not an error concerning the data attribute has occurred. The method for determining whether or not an error concerning the data attribute has occurred is not limited to that illustrated in FIG. 8. For example, when data having different sizes of document pages and output sheets coexist in the print data (for example, an output sheet size is "A4 size", while a document size is "A3 size") or when document sizes coexist (when an A3 size document and an A4 size document coexist in the print data), the processor 252 may determine that an error occurs.

Returning to FIG. 6, in step S109, the processor 252 determines whether or not an error occurs, based on a result of the determination of step S107. When it is determined that an error occurs, the processor 252 skips steps S110 to S112 and proceeds to step S113. Meanwhile, when it is determined that no error occurs, the processor 252 proceeds to step S110.

In step S110, the processor 252 determines whether or not an error concerning the apparatus attribute has occurred.

Figure 9:
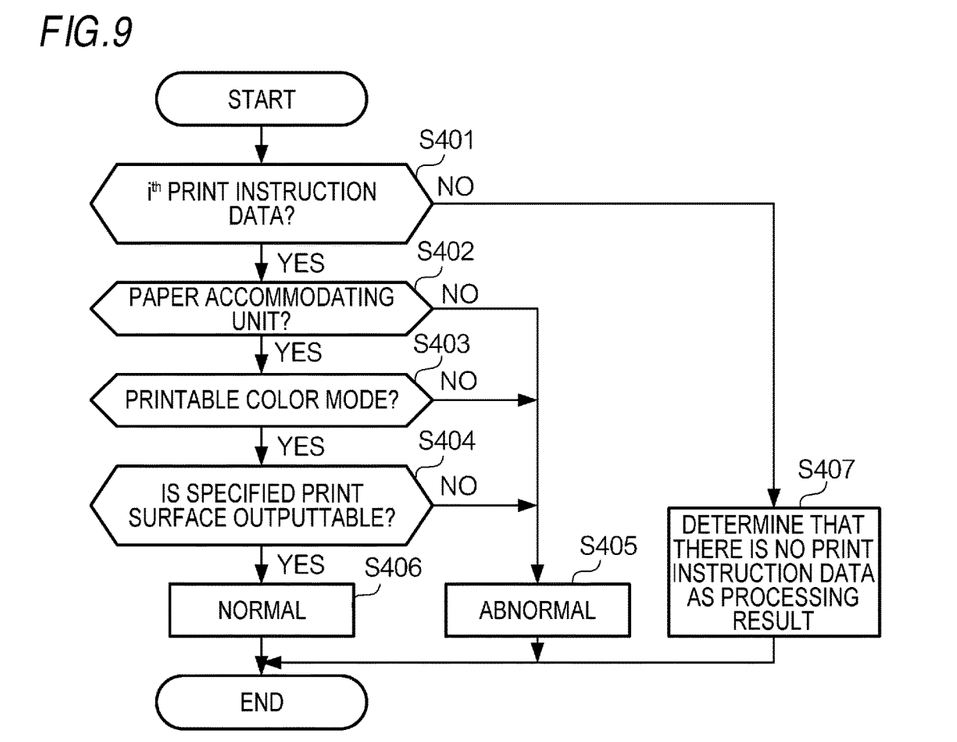
FIG. 9 is a flowchart illustrating a flow of a process of determining the presence/absence of an occurrence of an error related to an apparatus attribute.

FIG. 9 is a flowchart illustrating an example of a flow of a process (step S110 in FIG. 6) for determining whether or not an error concerning the apparatus attribute has occurred. In step S401, the processor 252 determines whether the $i^{th}$ print instruction data exists. When it is determined that the $i^{th}$ print instruction data exists (YES in step S401), the processor 252 proceeds to step S402. Meanwhile, when it is determined that there is no $i^{th}$ print instruction data (NO in step S401), the processor 252 proceeds to step S407. In step S407, the processor 252 determines that there is no print instruction data as a processing result.

In step S402, the processor 252 determines whether or not the paper accommodating unit specified in the print instruction data exists in the image forming apparatus 30 according to the apparatus attribute acquired from the image forming apparatus 30. When it is determined that the paper storage exists, the processor 252 proceeds to step S403. Meanwhile, when it is determined that no paper storage exists, the processor 252 proceeds to step S405.

In step S403, the processor 252 determines whether or not a color mode (monochrome/color, etc.) specified in the print instruction data can be printed by the image forming apparatus 30, according to the apparatus attribute acquired from the image forming apparatus 30. When it is determined that a color mode can be printed, the processor 252 proceeds to step S404. Meanwhile, when it is determined that a color mode cannot be printed, the processor 252 proceeds to step S405.

In step S404, the processor 252 determines whether or not the printing process on a printing surface (single sided/duplex side, etc.) specified in the print instruction data can be output by the image forming apparatus 30, according to the apparatus attribute acquired from the image forming apparatus 30. When it is determined that the printing can be output, the processor 252 proceeds to step S406. Meanwhile, when it is determined that the printing cannot be output, the processor 252 proceeds to step S405.

In step S406, the processor 252 determines that no error concerning the apparatus attribute occurs (normal). Meanwhile, in step S405, the processor 252 determines that an error concerning the apparatus attribute occurs.

In this operation example, the operation exemplified in FIG. 9 has been described as an operation example for determining whether or not an error concerning the apparatus attribute has occurred. A method of determining whether or not an error concerning the apparatus attribute has occurred is not limited to that illustrated in FIG. 9. For example, in an image forming apparatus including a post-processing device such as a stapling device, when the post-processing function specified by the processing attribute may not be implemented in the actual post-processing device, the processor 252 may determine that an error concerning the apparatus attribute has occurred.

Returning to FIG. 6, in step S111, the processor 252 determines whether an error occurs, based on a result of the determination of step S110. When it is determined that an error occurs, the processor 252 skips step S112 and proceeds to step S113. Meanwhile, when it is determined that no error occurs, the processor 252 proceeds to step S112.

In step S112, the processor 252 performs the interpreting process the print data based on the processing attribute. That is, in the exemplary embodiment, when it is not possible to determine from at least one of the processing attribute, the apparatus attribute and the data attribute whether or not an error occurs in the printing process corresponding to the printing instruction, the processor 252 requests the print data interpretation unit to perform the interpreting process for the print data based on the processing attribute.

In the exemplary embodiment, the processor 252 converts the print data into intermediate data which is data at a stage prior to being output to the image forming apparatus. The intermediate data is data in a format that does not depend on the type of the image forming apparatus 30, such as data in a WMF (Windows Metafile) format or XPS (XML Paper Specification) format. The generated intermediate data is stored in a predetermined memory area of the memory 251.

In the exemplary embodiment, whether or not the printing process corresponding to the print instruction data is processed without an error is determined based on an error occurring in the process of converting the print data into the intermediate data and information (log) indicating the cause thereof. The intermediate data generated by this determining process may be discarded to eliminate a need of save. Even when raster image data is generated from the print data without passing through the intermediate data, the process of interpreting the print data always occurs and, if this interpreting process is a function of predicting an error, there is no need to save the raster image data generated as a result of the interpreting process.

For example, in a case where necessary data is not registered in the print server 20 when plural print data are synthesized to perform a printing process (a built job) based on a printing instruction, an error may occur in the process of converting the print data into the intermediate data. In the exemplary embodiment, the processor 252 determines whether or not an error occurs in the process of converting the print data into the intermediate data prior to the actual printing process to estimate whether or not an error occurs in the actual printing process. As the processing attribute used in this determination, for example, the type of a recording medium for which output is specified, other print data necessary for a build job, a specified range of build job for partial extraction and output, and the like are used.

In addition, in step S116, the processor 252 determines whether or not an error occurs, based on a predetermined combination of the processing attribute, data attribute and apparatus attribute. For example, the processor 252 determines, from printing surface selection (processing attribute), start page number (data attribute) and a single-sided/duplex setting value (apparatus attribute), whether or not print surface designation is correct.

Figure 10:
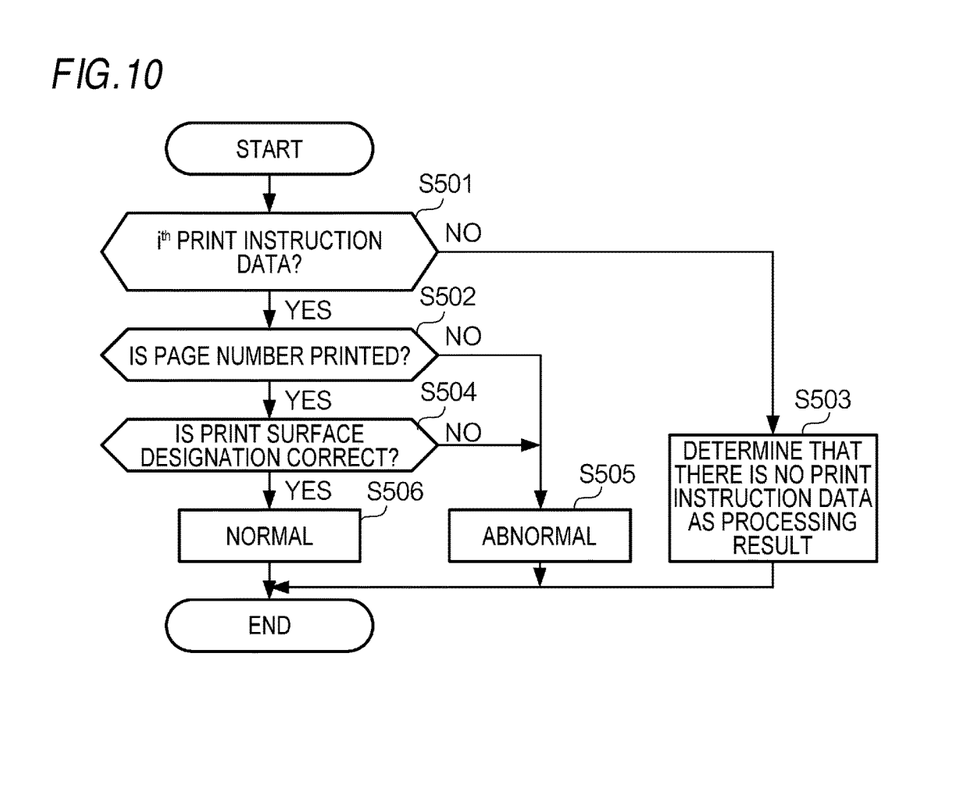
FIG. 10 is a flowchart illustrating a flow of a process of determining the presence/absence of an occurrence of an error by a combination of attributes.

FIG. 10 is a flowchart illustrating an example of a flow of a process for determining whether or not an error has occurred, by a combination of attributes (step S116 in FIG. 6). In step S501, the processor 252 determines whether or not the $i^{th}$ print instruction data exists. When it is determined that the $i^{th}$ print instruction data exists (NO in step S501), the processor 252 proceeds to step S502. Meanwhile, when it is determined that there is no $i^{th}$ print instruction data, the processor 252 proceeds to step S503.

In step S502, the processor 252 determines whether or not a page number is printed, based on a setting value of an "output page range" that is the processing attribute of the $i^{th}$ print instruction data. When it is determined that the page number is printed, the processor 252 proceeds to step S504. Meanwhile, when it is determined that the page number is not printed, the processor 252 proceeds to step S505.

In step S504, the processor 252 determines whether or not the printing surface designation is correct. This determination is made based on a combination of setting value (processing attribute) of the printing surface (duplex/single-sided, etc.), the start page number (data attribute) and an apparatus attribute regarding duplex/single-sided. When it is determined that the printing surface designation is correct, the processor 252 proceeds to step S506. Meanwhile, when it is determined that the printing surface designation is incorrect, the processor 252 proceeds to step S505.

In step S506, the processor 252 determines that no error occurs in the determination using the attribute combination. Meanwhile, in step S505, the processor 252 determines that an error occurs. The determining method using the attribute combination is not limited to that illustrated in FIG. 10. The determination may be performed using a combination of other attributes.

Returning to FIG. 6, in step S113, when information indicating the occurrence of an error is included in the processing result of the interpreting process or when it is determined in steps S107, S109 and S111 that an error occurs, the processor 252 controls the client device 10 to display information indicating the occurrence of error in the printing process and information indicating the cause of the error. Specifically, in the exemplary embodiment, the processor 252 transmits information indicating the determination result to the client device 10. The processor of the client device 10 displays the determination result on the display device according to the received information.

Figure 11:
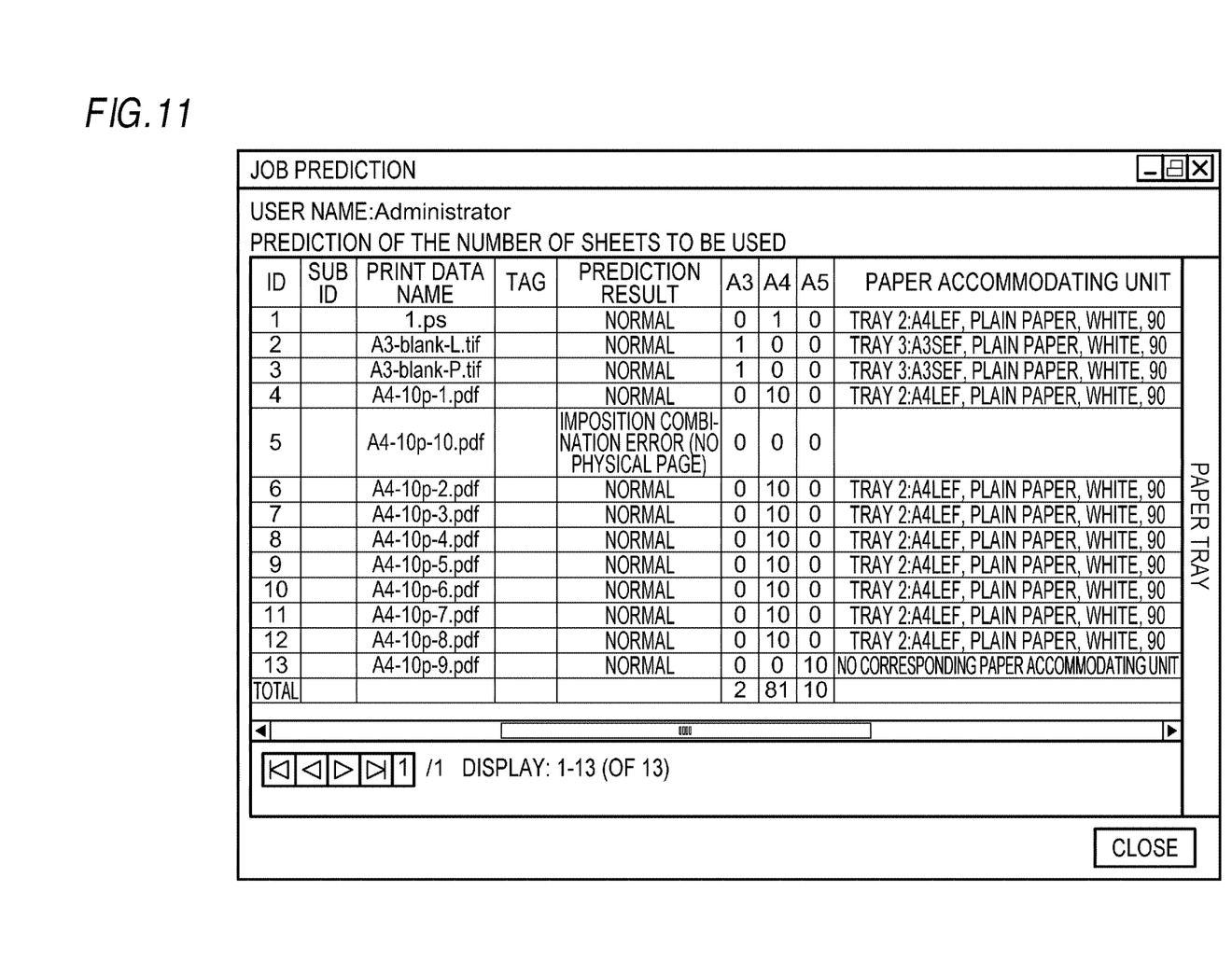
FIG. 11 is a view illustrating an example of a screen illustrating a check result.

FIG. 11 is a view illustrating an example of a screen displayed on the display device of the client device 10. In the example of FIG. 11, regarding the print instruction data of ID "5", information "imposition combination error (no physical page)" is displayed as a prediction result. Further, regarding the print instruction data whose ID is "13", a message "No corresponding paper accommodating unit" is displayed.

Returning to FIG. 6, in step S114, the processor 252 determines whether or not unprocessed print instruction data is left. When unprocessed print instruction data is left, the processor 252 proceeds to step S115. Meanwhile, when it is determined that no unprocessed print instruction data is left, the processor 252 ends the process as it is.

In step S115, the processor 252 increments a counter i and executes a process after step S103 on the next print instruction data. In this manner, the presence/absence of occurrence of an error is predicted for each print instruction data stored in the print server 20, and a prediction result is displayed on the display device of the client device 10. That is, in the exemplary embodiment, when it is determined from the analysis result of the printing instruction that an error occurs, the processor 252 performs a process of displaying information indicating that an error occurs and information indicating the cause of the error on the display device every time the determination is made.

In the exemplary embodiment, the intermediate data generated in step S112 is used in the printing process performed in the subsequent stage. That is, in the exemplary embodiment, the print data interpretation unit 24 (see FIG. 2) that converts the print data into the intermediate data, which is realized by the processor 252, also serves as an intermediate data generating unit for interpreting the print data to generate the intermediate data when an image forming process corresponding to the print instruction is executed.

When the execution of the image forming process is instructed after the error occurrence checking process is performed, if the intermediate data corresponding to the print instruction data is stored in the memory 251, the processor 252 reads the intermediate data from the memory 251 and uses the read intermediate data to request the image forming apparatus 30 to perform the image forming process. Meanwhile, if the intermediate data is not stored in the memory 251, the processor 252 performs a process of converting the print data corresponding to the print instruction data into the intermediate data and uses the obtained intermediate data to request the image forming apparatus 30 to perform the image forming process.

As described above, in the exemplary embodiment, it is predicted whether or not an error of the printing process occurs, from the setting of the printing process and the state of the connected image forming apparatus without actually executing the printing process. In particular, in the exemplary embodiment, it is notified to the user whether or not an error occurs in the printing process before the printing process is executed without converting the print data included in the print instruction data into bitmap image data.

[3] Modifications

The above-described exemplary embodiment is merely an example of the present invention and may be modified as follows. In addition, the above-described exemplary embodiment and modifications described below may be implemented in combination as necessary.

(1) In the above-described exemplary embodiment, the process of converting the print data into the intermediate data is performed as the interpreting process of the print data. However, the interpreting process is not limited thereto. For example, it may be a process of converting the print data into raster image data.

(2) In the above-described exemplary embodiment, the print data interpretation unit 24 also serves as an intermediate data generating unit that interprets the print data to generate the intermediate data when the printing process corresponding to the print instruction data is executed. However, the functional configuration of the print server 20 is not limited thereto. For example, the print data interpretation unit and the intermediate data generating unit may be provided separately.

(3) In the above-described exemplary embodiment, a process of checking the presence/absence of occurrence of an error is sequentially performed for plural print instruction data stored in the print server 20, and a checking result is displayed on the display device each time it is output. However, the timing at which the checking result is displayed is not limited thereto. For example, the processor 252 does not perform the displaying process until the process of checking the presence/absence of occurrence of an error for the plural print instruction data stored in the print server 20 is completed, but may perform a process of displaying the information indicating the occurrence of the error and the information indicating the cause of the error on the display device collectively after the checking process for the plural print instruction data accumulated in the print server is completed (i.e., after the analysis process has been performed to the end).

(4) In the above-described exemplary embodiment, the system 1 including one client device 10 and one image forming apparatus 30 is exemplified, but the number of device/apparatuses constituting the system 1 is not limited thereto. For example, plural client devices 10 may be included in the system 1.

(5) In the above-described exemplary embodiment, a program executed by the processor 152 of the client device 10 may be downloaded via a communication line such as the Internet. In addition, this program may be provided in a form recorded in a computer-readable recording medium such as a magnetic recording medium (such as a magnetic tape, a magnetic disk, etc.), an optical recording medium (such as an optical disc, etc.), a magneto-optical recording medium, a semiconductor memory or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a memory and processor, the memory and processor configured to perform the following:
   acquire a processing attribute of a printing process corresponding to a printing instruction for executing the printing process using print data;
   acquire an apparatus attribute of an image forming apparatus that executes the printing process;
   acquire a data attribute of the print data;
   perform an interpreting process for the print data based on the processing attribute; and
   perform the interpreting process according to the printing instruction when it is not possible to determine from at least one of the processing attribute, the apparatus attribute and the data attribute whether or not an error occurs in the printing process; and
   a controller configured to display information indicating that the error occurs in the printing process and information indicating a cause of the error on a display when information indicating the occurrence of the error is included in a processing result of the interpreting process.

2. The information processing apparatus according to claim 1, wherein the processor is further configured to convert the print data into intermediate data that is data at a stage prior to being output to the image forming apparatus.

3. The information processing apparatus according to claim 1, wherein the processor is further configured to interpret the print data to generate intermediate data when executing a printing process corresponding to the printing instruction.

4. The information processing apparatus according to claim 2, wherein the processor is further configured to interpret the print data to generate intermediate data when executing a printing process corresponding to the printing instruction.

5. The information processing apparatus according to claim 1, wherein
the controller is configured to acquire an interpretation result of the printing instruction which the processor has analyzed to an end and determines whether the error occurs in the printing process, and
the controller is configured to display the information indicating that the error occurs and the information indicating the cause of the error on the display after the processor completes an analyzing process of the printing instruction.

6. The information processing apparatus according to claim 2, wherein
the controller is configured to acquire an interpretation result of the printing instruction which the processor has analyzed to an end and determines whether the error occurs in the printing process, and
the controller is configured to display the information indicating that the error occurs and the information indicating the cause of the error on the display after the processor completes an analyzing process of the printing instruction.

7. The information processing apparatus according to claim 3, wherein
the controller is configured to acquire an interpretation result of the printing instruction which the processor has analyzed to an end and determines whether the error occurs in the printing process, and
the controller is configured to display the information indicating that the error occurs and the information indicating the cause of the error on the display after the processor completes an analyzing process of the printing instruction.

8. The information processing apparatus according to claim 4, wherein
the controller is configured to acquire an interpretation result of the printing instruction which the processor has analyzed to an end and determines whether the error occurs in the printing process, and
the controller is configured to display the information indicating that the error occurs and the information indicating the cause of the error on the display after the processor completes an analyzing process of the printing instruction.

9. The information processing apparatus according to claim 1, wherein the controller is configured to display the information indicating that the error occurs and the information indicating the cause of the error on the display every time it is determined from an analysis result of the printing instruction by the processor that the error occurs.

10. The information processing apparatus according to claim 2, wherein the controller is configured to display the information indicating that the error occurs and the information indicating the cause of the error on the display every time it is determined from an analysis result of the printing instruction by the processor that the error occurs.

11. The information processing apparatus according to claim 3, wherein the controller is configured to display the information indicating that the error occurs and the information indicating the cause of the error on the display every time it is determined from an analysis result of the printing instruction by the processor that the error occurs.

12. The information processing apparatus according to claim 4, wherein the controller is configured to display the information indicating that the error occurs and the information indicating the cause of the error on the display every time it is determined from an analysis result of the printing instruction by the processor that the error occurs.

13. An information processing method comprising:
acquiring a processing attribute of a printing process corresponding to a printing instruction for executing the printing process using print data;
acquiring an apparatus attribute of an image forming apparatus that executes the printing process;
acquiring a data attribute of the print data;
when it is not possible to determine from at least one of the processing attribute, the apparatus attribute and the data attribute whether or not an error occurs in the printing process, requesting a processor, that performs an interpreting process for the print data based on the processing attribute, to perform the interpreting process according to the printing instruction; and
when information indicating the occurrence of the error is included in a processing result of the interpreting process, displaying information indicating that the error occurs in the printing process and information indicating a cause of the error on a display.

14. A non-transitory computer readable storage medium storing a program causing a computer to execute information processing comprising:
acquiring a processing attribute of a printing process corresponding to a printing instruction for executing the printing process using print data;
acquiring an apparatus attribute of an image forming apparatus that executes the printing process;
acquiring a data attribute of the print data;
when it is not possible to determine from at least one of the processing attribute, the apparatus attribute and the data attribute whether or not an error occurs in the printing process, requesting a processor, that performs an interpreting process for the print data based on the processing attribute, to perform the interpreting process according to the printing instruction; and
when information indicating the occurrence of the error is included in a processing result of the interpreting process, displaying information indicating that the error occurs in the printing process and information indicating a cause of the error on a display.

* * * * *